June 11, 1929.  W. A. RIDDELL  1,716,463
INTERMITTENT FEED MECHANISM
Filed Sept. 4, 1926  2 Sheets-Sheet 1
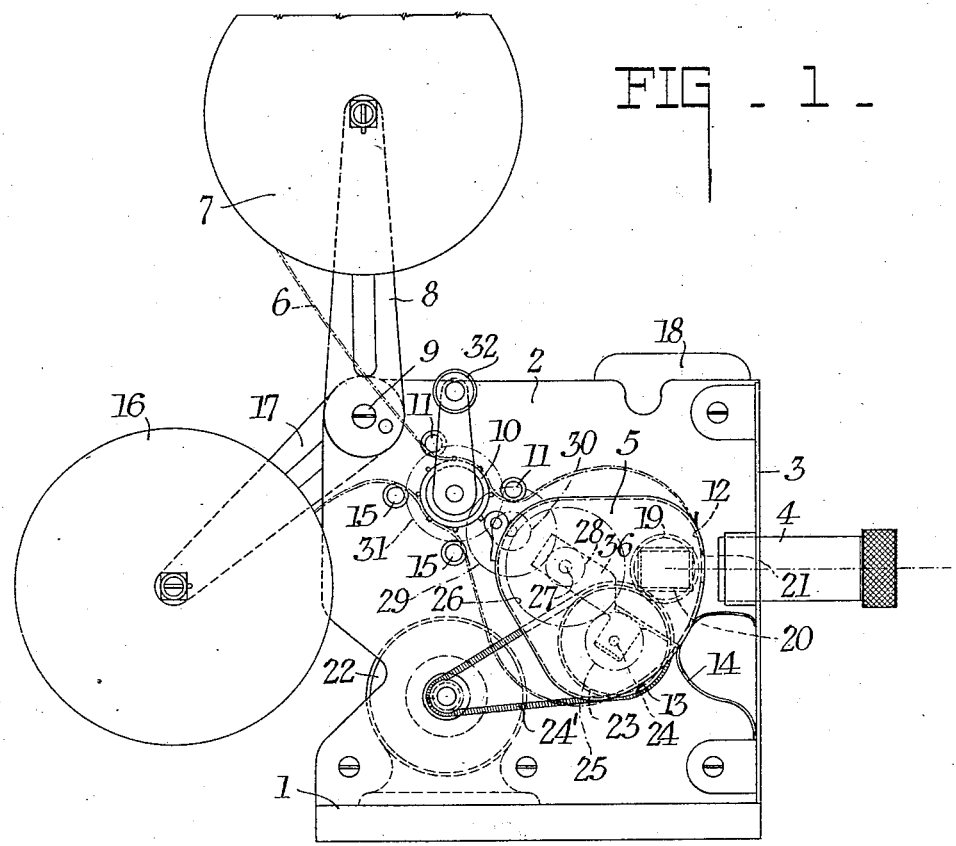
FIG - 1 -
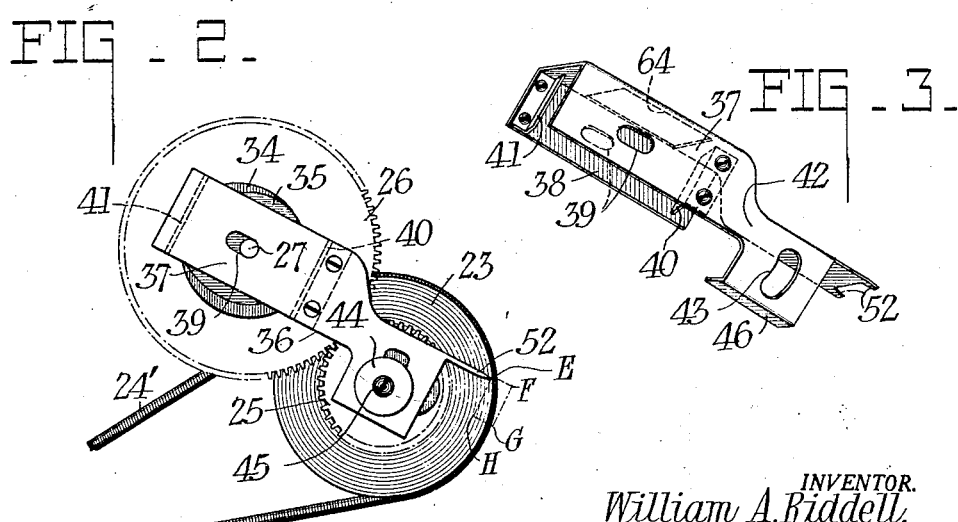
FIG - 2 -
FIG - 3 -
INVENTOR.
William A. Riddell,
BY P. L. Stinchfield
N. M. Perrin
ATTORNEYS.

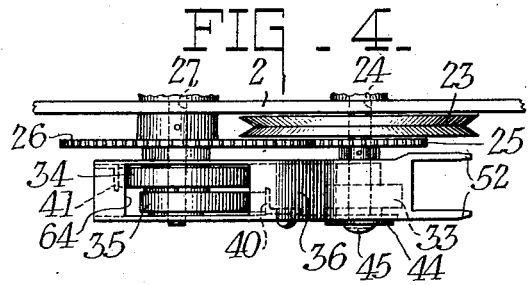
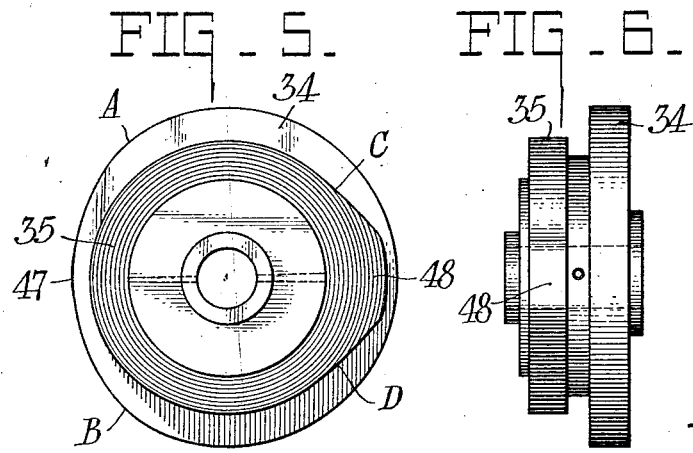
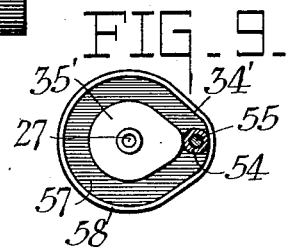
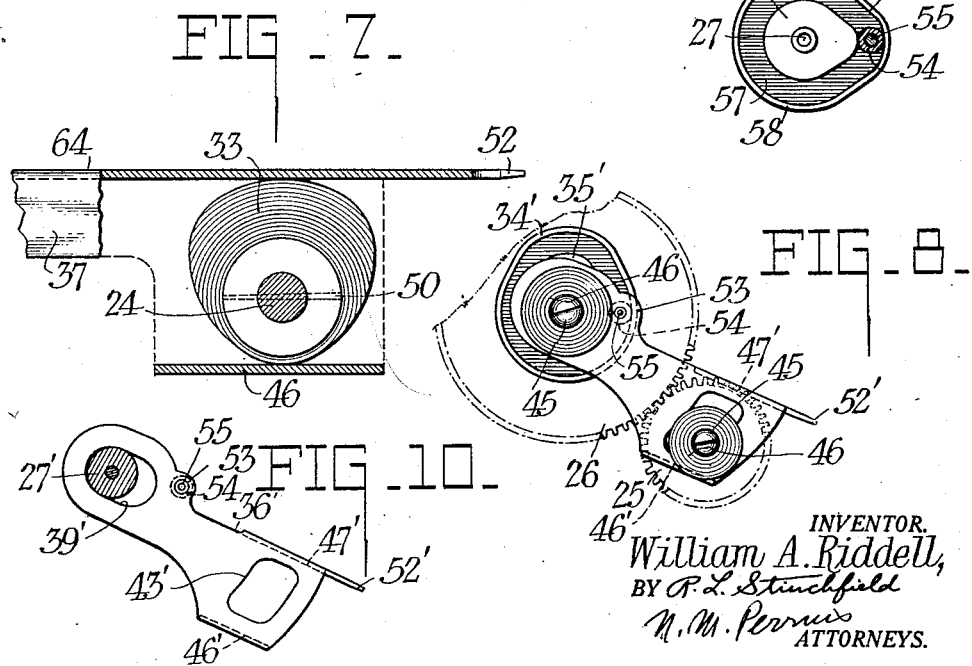

Patented June 11, 1929.

1,716,463

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

INTERMITTENT-FEED MECHANISM.

Application filed September 4, 1926. Serial No. 133,697.

This invention relates to motion picture apparatus and more particularly to a mechanism of the claw type for intermittently advancing the film through the gate of a projector.

The objects of the invention are to provide in such a mechanism, a very short pulldown interval, to render the path of the claw controllable so that it will be efficient in its action, and to furnish a mechanism that can be readily manufactured and used.

These and other objects will appear from the following description, wherein reference will be made to the accompanying drawings, in which the same reference characters denote the same parts throughout and in which Fig. 1 is a side view of a projector in which my improved mechanism is embodied, certain hidden parts being shown in broken lines.

Fig. 2 is a side view of one form of my improved film advancing mechanism.

Fig. 3 is a perspective view of the claw-carrying lever arm.

Fig. 4 is a top view of the film advancing mechanism.

Fig. 5 is a side view of the double cam, controlling the rear end of the lever.

Fig. 6 is an edge view of the double cam.

Fig. 7 is a side view of the single cam controlling the front end of the lever, a fragment of the latter being also shown.

Fig. 8 is a side view of a second embodiment of my improved film advancing mechanism.

Fig. 9 is a side view of the double cam used in the second embodiment.

Fig. 10 is a side view of the claw-carrying arm used in the second embodiment and showing one shaft in section.

I have chosen, as an illustrative embodiment, to show my improved pulldown in a projector of a type now on the market and comprising a base 1, a longitudinal frame 2 carrying a flange 3 supporting the lens mount 4, and carrying a casing 5 within which are the film moving elements. A strip of film 6 is supplied from a reel 7 carried on an arm 8 pivoted at 9, and passes over a sprocket 10, beneath upper guide rolls 11, in a loop around the casing 5, the front portion of which 12 constitutes the rear fixed member of a curved film guideway, against which the film is held by a corresponding bowed member 13 pressed into place by a spring 14, thence to the sprocket 10 and lower guide rolls 15, to the take-up reel 16 on arm 17 also pivoted at 9.

A lamphouse 18 behind the frame 2 emits light through a window 19 in the frame 2, which is reflected by mirror 20 to the window 21 in the gate. A motor 22 on the base 1 drives a pulley 23 by means of a coiled friction belt 24'. Pulley 23 in part extends through a suitable slot in the casing 5 and is mounted on a shaft 24 with gear 25 which intermeshes with a gear 26 of twice its diameter, the latter being on a shaft 27 with a gear 28 which intermeshes with gear 29, coaxial with gear 30, the latter intermeshing with a gear 31 coaxial with sprocket 9. All of these gears are shown in Fig. 1 in broken lines. A handle 32 may be utilized to drive the sprocket and the rest of the mechanism if the motor is disconnected.

Upon shaft 24 is pinned at 50 a cam 33, and upon shaft 27 are pinned two cams 34 and 35. A lever arm 36 is mounted to move about shafts 24 and 27 under the control of the cams 33, 34 and 35. This arm at its front end has the claws 52 which engage the film through slits (not shown) in the wall 12 of the casing 5. Near its rear end it has side flanges 37 and 38 with registering slots 39 by which it is adapted to have a sliding and pivotal movement on shaft 27. Flange 37 carries, forwardly of its slot 39, an abutment 40 extending into the path of movement of cam 35, and flange 38, carries, rearwardly of its slot 39, an abutment 41 extending into the path of movement of cam 34. Flange 37 is extended forwardly and downwardly at 42 and has an arcuate slot 43 in this portion which is loosely engaged over shaft 24, being held in place by washer 44 and a screw 45. This portion is bent over to form a lower flange 46 in the path of movement of the cam 33. The cam 33 is of the type known as a "Lumière cam" and fits between the lower flange 46 and the body of the lever 47. The body of the lever is bent in the manner illustrated and has in its rear portion an opening 64 through which portions of the cams 34 and 35 may extend.

When the mechanism is operated, either from the handle 32 or motor 22, gear 25 makes two revolutions for every revolution of gear 26. The periphery of cam 34 is a circular arc of substantially 300° between the points A and B, and to the right of them as shown in Fig. 5 and centered on the axis of the shaft, and for 60° to the left of these points it is flattened at 47. During about 300° of rotation, the arc engages the abutment 41 and holds the lever arm 36 in retracted position, that is to the left as shown. During the other 60° the arm 36 is free to move to the right or forwardly and is then forced back. Cam 35 has a circular arc of substantially 300° between the points C and D and to the left of them as shown in Fig. 5, while the periphery of the cam is extended at 48 to form a protuberance between these points and to the right of them as shown. As illustrated in Fig. 5, both cams are symmetrical about a horizontal axis. The protuberance 48 will engage the abutment 40 and move the arm 36 forwardly or to the right at the same time that the flattened surface 47 is passing abutment 41 and permitting such movement; and it then permits the retraction of the arm as cam 34 pushes it back. Obviously, slots 39 must be long enough and slot 43 must be wide enough to permit this movement between the shafts and the arm. Cam 33 gives the forward end of the arm 36 an oscillatory up and down movement, completing two cycles to one cycle of the rear cams. The path of movement is shown in dotted lines in Fig. 2. It will be understood from the above description that the claw will pass around E F G H and then will have an idle oscillation from H to E and back again and then repeat the cycle. By reason of the double cam the arm will oscillate about shaft 27 during this idle stroke and not have a sliding movement also, as would be necessary if a single cam engaging two abutments were used on shaft 27. The making of separate cams controlling the backward and forward movement reduces the wear on each cam, permits in practice of designing a very smoothly working movement with a very quick pulldown and has other practical advantages in manufacture and operation.

Another embodiment of my invention is shown in Figs. 8, 9 and 10. The general structure, arrangement, position and operation of this are, except as specifically pointed out, the same as in the form already described. The arm 36' is flat and parallel to the gear discs 25 and 28 except for the flanges 46' and 47' and a projection 53, consisting of a roller 54 mounted on a pin 55. It has a slot 43' which, while shown as of slightly different form, has the same functions as the slot 43. The cam playing between flanges 46' and 47' is identical with the showing in Fig. 7 and is accordingly not separately shown. The flange 47' is extended to form a film engaging claw 52'. The arm has near its rear end a single slot 39' by which it can slide on shaft 27' being held in place by washer 54 and screw 55.

Rigidly connected to the shaft 27' and gear 28 are the cam members 34' and 35'. Cam 35' is similar in form and function to cam 35, already described, and its peripheral surface engages the projection 53 as cam 35 engages projection 40. Cam 34' comprises a base plate 57 and a flange 58, the interior surface of which is the cam surface and engages projection 53 with the same function and effect as cam 34 engages projection 41. The effective path of the claw is the same as in the first embodiment.

In each embodiment, it is to be noted that there are two cams, one pressing against a part of the arm to move it in one direction, and the other having a face operative in the other direction to engage a part of the arm and move it back.

The precise path followed by the claw is determined by the shape of the cams. The angular size and the curvature of the non-circular portions of the cam surfaces would be laid out, in designing the apparatus, so as to produce a path of the desired length and curvature, as required by the particular apparatus with which it is to be used. It is obvious that numerous embodiments of my invention are possible, and I contemplate as included within my invention all such modifications and equivalents as fall within the scope of the appended claims.

Having thus described my invention, what I claim as new and desire to secure by Letters Patent is:

1. In motion picture apparatus, film advancing mechanism having a definite cycle of movement and comprising an arm having a claw, two interconnected shafts, two cams rigidly connected with one shaft to turn therewith, and engaging said arm, one cam engaging the arm during one portion of the cycle to move the arm in one direction only and the other engaging the arm during another portion of the cycle being adapted to move it in the reverse direction only, longitudinally of itself, and a cam rigidly connected with the other shaft to turn therewith and engaging said arm to oscillate it transversely of its length.

2. In motion picture apparatus, film advancing mechanism having a definite cycle of movement and comprising an arm having a claw at one end, two intergeared discs, the circumference of one being a multiple of the circumference of the other, a cam rigid with the smaller disc and engaging the arm intermediate of its length to oscillate it transversely of its length, and two cams rigid with the larger disc and engaging the arm at different times in the cycle and in opposite directions at points near the other end of the arm and to oscillate it longitudinally.

3. In motion picture apparatus, film advancing mechanism comprising an arm having a claw at one end, two directly intergeared discs, the circumference of one being a multiple of the circumference of the other, two cams rigid with the larger gear disc and each engaging a part of the arm, the engaging faces of the cams being oppositely directed whereby the cams oscillate the arm longitudinally of itself, and a cam rigid with the smaller gear disc and engaging the arm to oscillate it transversely of its length.

4. In motion picture apparatus, a guideway for film and mechanism for advancing film through said guideway, said mechanism comprising an arm having a claw at one end, two shafts interconnected for simultaneous rotation, two cams rigidly connected with one of said shafts and rotatable therewith, one of said cams having a cam surface engaging a part of said arm in a direction toward said guideway, and the other cam having a cam surface engaging a part of said arm in a direction facing away from said guideway, whereby the two cam surfaces are adapted to move the arm longitudinally toward and from said guideway, and a cam rigidly connected with said other shaft and rotatable therewith and engaging said arm to oscillate it longitudinally of the guideway and transversely of its own length.

5. In motion picture apparatus, a guideway for film and mechanism having a definite cycle of movement for advancing film through said guideway, said mechanism comprising two directly intergeared discs, the circumference of one of which is an even multiple of the circumference of the other, two cams rigidly connected with the larger of said discs, an arm having a claw at one end and engaging both said cams near its other end, one cam effectively engaging the arm in one direction during a portion of the cycle and thereby being adapted to move the arm toward the guideway and the other cam effectively engaging the arm in the reverse direction during another portion of the cycle and thereby being adapted to move the arm from the guideway, and a cam rigidly connected with the smaller of said discs and engaging the arm at an intermediate point and oscillating it longitudinally of the guideway.

6. In motion picture apparatus, a guideway for film, two shafts, one being farther from the guideway than the other, intergeared discs mounted on said shafts, the circumference of the disc on the shaft farther from the guideway being an even multiple of the circumference of the other, an arm carrying at one end a claw for engaging and advancing film in the guideway, a cam on the shaft nearer the guideway engaging the arm at an intermediate point and adapted to oscillate it in a direction longitudinally of the guideway, and two cams on the other shaft engaging the arm, one effectively engaging it in one direction at certain times and thereby being adapted to move it toward the guideway and the other effectively engaging it in the reverse direction at other times and thereby being adapted to move it away from the guideway.

7. In a motion picture apparatus, a guideway for film, two directly intergeared discs, one being farther from the guideway than the second and having a circumference that is a multiple of the circumference of the second, an arm having a claw at the end toward the guideway, two cams rigid with the first disc and each engaging a part of the arm, the engaging faces of the cams being oppositely directed, whereby the cams oscillate the arm longitudinally of itself toward and from the guideway, and a cam rigid with the smaller disc and engaging the arm to oscillate it transversely of its length and longitudinally of the guideway.

Signed at Rochester, New York this 31st day of August, 1926.

WILLIAM A. RIDDELL.